United States Patent [19]
Kudo et al.

[11] Patent Number: 5,546,790
[45] Date of Patent: Aug. 20, 1996

[54] LOW MOLECULAR WEIGHT ORGANIC LIQUID LEAKAGE DETECTION SYSTEM

[75] Inventors: Toshio Kudo, Arida; Masaaki Nagai, Amagasaki; Yasuo Shiraiwa, Yokohama, all of Japan

[73] Assignees: Mitsubishi Cable Industries, Ltd., Hyogo; Tatsuno Corporation, Tokyo, both of Japan

[21] Appl. No.: 422,309

[22] Filed: Apr. 13, 1995

[30] Foreign Application Priority Data

Apr. 13, 1994 [JP] Japan .................................. 6-074912

[51] Int. Cl.$^6$ .............................. G08B 21/00; G01M 3/40
[52] U.S. Cl. ........................ 73/40.500 R; 73/40; 340/605
[58] Field of Search ............................. 73/40.5 R, 40; 340/605

[56] References Cited

U.S. PATENT DOCUMENTS

| | | | |
|---|---|---|---|
| 3,485,085 | 12/1969 | Hawtins, Jr. ................................ | 73/46 |
| 4,206,632 | 6/1980 | Suzuki .................................. | 73/40.5 R |
| 4,487,057 | 12/1984 | Lutz ...................................... | 73/40.5 R |
| 4,570,477 | 2/1986 | Sugibuchi ............................. | 73/40.5 R |
| 4,653,958 | 3/1987 | Anderson et al. ...................... | 405/157 |
| 4,673,926 | 6/1987 | Gorman .................................. | 340/605 |
| 4,910,998 | 3/1990 | Willis et al. ......................... | 73/40.5 R |
| 5,101,657 | 4/1992 | Labloud et al. ...................... | 73/40.5 R |
| 5,140,847 | 8/1992 | Tausch et al. ......................... | 73/40 |
| 5,173,684 | 12/1992 | Iriji et al. .............................. | 340/605 |
| 5,279,148 | 1/1994 | Brandes ............................... | 73/40.5 R |

*Primary Examiner*—Hezron E. Williams
*Assistant Examiner*—J. David Wiggins
*Attorney, Agent, or Firm*—Wenderoth, Lind & Ponack

[57] ABSTRACT

A low molecular weight organic liquid leakage detection system comprising plural sensors capable of showing an electrical resistance variation upon contact with a low molecular weight organic liquid, said sensors being installed at every possible leakage site, being electrically connected in series, and being electrically further connected to an electric resistance detector. The detection system of the present invention is advantageous in that it permits precise and efficient detection of low molecular weight organic liquid leakage, with no need to provide a long sensor over the entire detection area.

10 Claims, 6 Drawing Sheets

LOW MOLECULAR WEIGHT ORGANIC LIQUID LEAKAGE DETECTION SYSTEM

FIELD OF THE INVENTION

The present invention relates to a low molecular weight organic liquid leakage detection system. More particularly, the present invention relates to a system allowing detection of a low molecular weight organic liquid leakage from a pipeline or a large volume storage container, efficiently with precision over a wide area, particularly to the longitudinal direction.

BACKGROUND OF THE INVENTION

Pipelines consisting of plural metal tubes which are connected with flanges, and valves provided as necessary between such metal tubes, are widely used for transporting low molecular weight organic liquids such as gasoline and fuel oil. Low molecular weight organic liquids sometimes leak from flange connections or valve portions of pipelines.

Heretofore, there has been known a sensor capable of detecting leakage of a low molecular weight organic liquid, which comprises a conductive layer showing an electric resistance variation upon contact with a low molecular weight organic liquid, formed on a core (U.S. Pat. No. 5,378,995). For use of such sensor for the detection of a low molecular weight organic liquid leakage, however, the sensor should be manufactured long enough to run adjacent to a pipeline or wind around the pipeline. When formed into, for example, a sensor of a dozen-odd meters long or longer, the maximum electric resistance of the sensor exceeds 500 k$\Omega$ to result in high impedance, since the sensor's resistance is about several dozens k$\Omega$/m (generally about 40 k$\Omega$/m). Consequently, the sensor easily suffers from external noises, so that the precise detection of electrical resistance variation upon contact with a low molecular weight organic liquid cannot be attained. For this reason, the detectable area of the above-mentioned sensor is limited to about a dozen meters long at most, which is unsuitable when the sensor should be run adjacent to the pipeline or wound therearound throughout the entire length of the pipeline.

SUMMARY OF THE INVENTION

It is therefore an object of the present invention to provide a low molecular weight organic liquid leakage detection system allowing detection of a low molecular weight organic liquid leakage from a pipeline or a large volume storage container, efficiently with precision over a wide area, particularly to the longitudinal direction.

The above-mentioned object can be achieved by the low molecular weight organic liquid leakage detection system of the present invention according to the following (1) to (10). (1) A low molecular weight organic liquid leakage detection system comprising plural sensors capable of showing an electrical resistance variation upon contact with a low molecular weight organic liquid, said sensors being installed at every possible leakage site, being electrically connected in series, and being electrically further connected to an electric resistance detector. (2) The detection system according to (1) above, wherein each of the sensors comprises, on a core, a conductive layer capable of showing an electric resistance variation upon contact with a low molecular weight organic liquid. (3) The detection system according to (2) above, wherein the conductive layer comprises a polymer material which swells by liquid absorption (hereinafter referred to as swellable polymer) and a conductive carbon. (4) The detection system according to (3) above, wherein the swellable polymer has a Shore A hardness of not more than 70. (5) The detection system according to (3) above, wherein the swellable polymer is substantially non-crosslinked. (6) The detection system according to (2) above, wherein the core is composed of a conductor coated with an insulating layer, and said conductor is electrically connected to the conductor of the core of a next sensor. (7) The detection system according to (1) above, wherein the sensor is built in an electrically insulating porous body. (8) The detection system according to (1) above, wherein the total initial resistance of the electrically connected sensors is not more than 500 k$\Omega$. (9) The detection system according to (1) above, wherein each sensor is detachably connected. (10) The detection system according to (1) above, further comprising a leaked liquid gathering means provided near the possible leakage site, wherein the sensor is installed at a position permitting detection of the liquid gathered by said leaked liquid gathering means.

As used herein, by liquid is meant liquid optionally in the form of aerosol due to vaporization.

The possible leakage site refers to, for example, pipe connections and valve attachments, in the case of pipeline for transporting gasoline, fuel oil and the like; weld zones formed when manufacturing a container, in the case of large volume storage container; and all other portions predictable of possible liquid leakage.

According to the present invention, plural sensors capable of showing electrical resistance variation upon contact with a low molecular weight organic liquid are installed at every possible leakage site, and said plural sensors are electrically connected in series. Once a low molecular weight organic liquid leaks, said liquid adheres to the sensor to cause variation in electric resistance, which variation is then transmitted to an electric resistance detector, whereby occurrence of leakage of the low molecular weight organic liquid is detected. By virtue of this construction, installation or winding of a long sensor throughout the entire length of a pipeline or over the entire area of a storage container becomes unnecessary. Moreover, simultaneous detection of liquid leakage at plural possible leakage sites becomes possible, since the installed sensors are electrically connected in series.

DETAILED DESCRIPTION OF THE INVENTION

The present invention is described in more detail by reference to the illustrative drawings.

Figure 1:
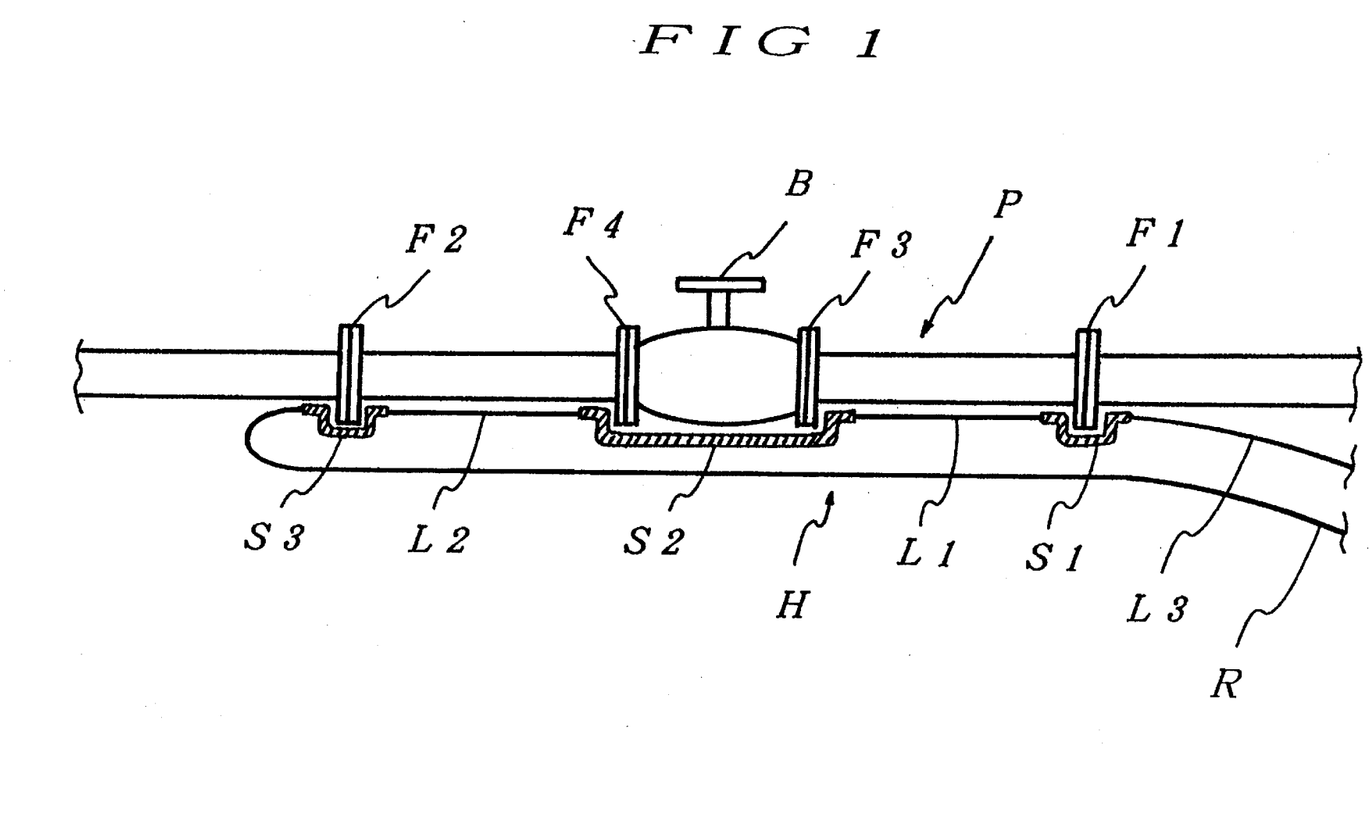
FIG. 1 is a partial side view showing one embodiment of the low molecular weight organic liquid leakage detection system of the present invention.

FIG. 1 is a partial side view showing one embodiment wherein a low molecular weight organic liquid leakage detection system is mounted on a pipeline. In the figure, H is a low molecular weight organic liquid leakage detection system, wherein plural sensors S1, S2 and S3, which show electric resistance variation upon contact with a low molecular weight organic liquid, are electrically connected in series by lead wires L1 and L2, and the sensor S1 which is located at a first end of the connected sensors is connected, with a lead wire L3, to an electric resistance detector (not shown) having a current-feeding function and electric resistance measuring function, and the sensor S3 which is located at a second end of the connected sensors is connected to the electric resistance detector with a return wire R. The above-mentioned sensors S1, S2 and S3 are located in such a manner that they are installed right under flange connections F1, F2, F3 and F4, and a valve B of a pipeline P.

The above-mentioned low molecular weight organic liquid is an organic liquid preferably having a molecular weight of not more than 300, particularly not more than 150, which is exemplified by alcohols, lubricant oils, ketones, light gas oil, kerosene, gasoline, naphtha, ligroin, benzene, toluene, xylene, crude oil and liquefied natural gas. These low molecular weight organic liquids are generally in a liquid form at room temperature.

As the above-mentioned sensor, any can be used as long as it can show electric resistance variation upon contact with a low molecular weight organic liquid. In the present invention, a sensor of the configuration disclosed in U.S. Pat. No. 5,378,995, wherein a conductive layer showing electric resistance variation upon contact with a low molecular weight organic liquid is coated on a core, is preferably used.

Figure 2:
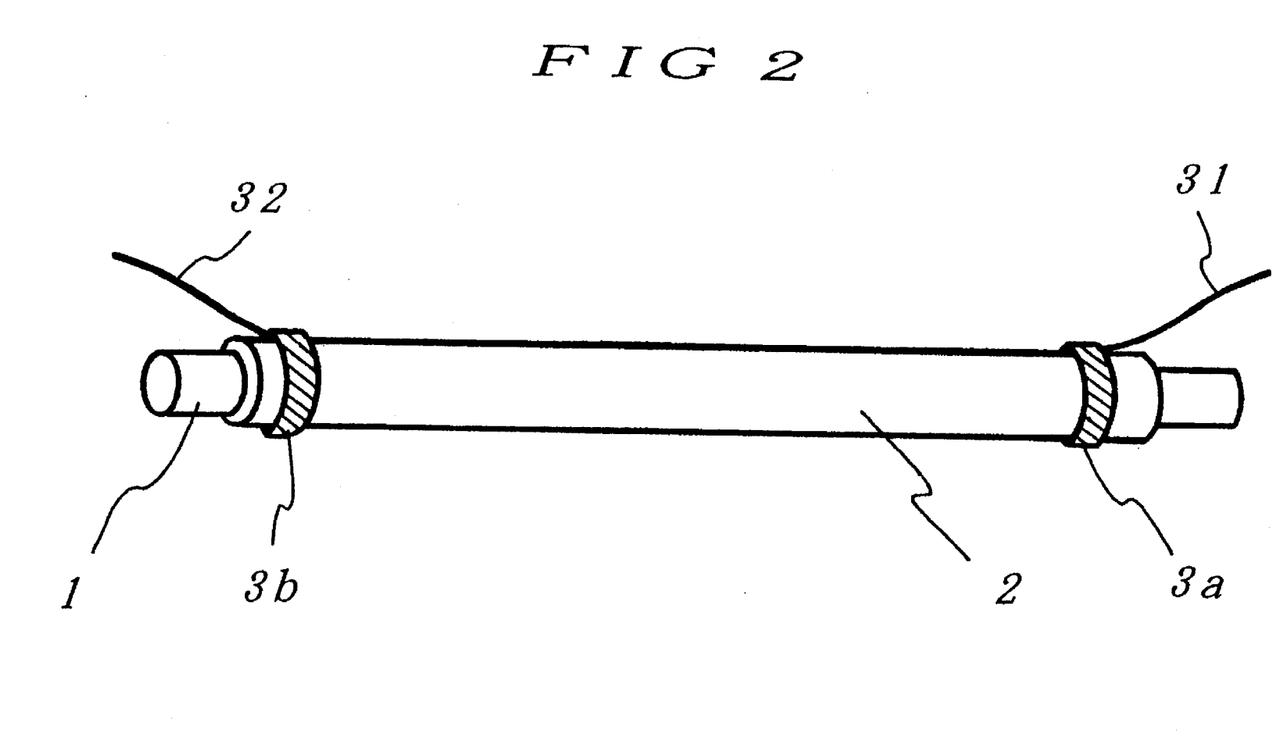
FIG. 2 is a perspective side view showing one embodiment of a wire-form sensor to be used in the present invention.
Figure 3:
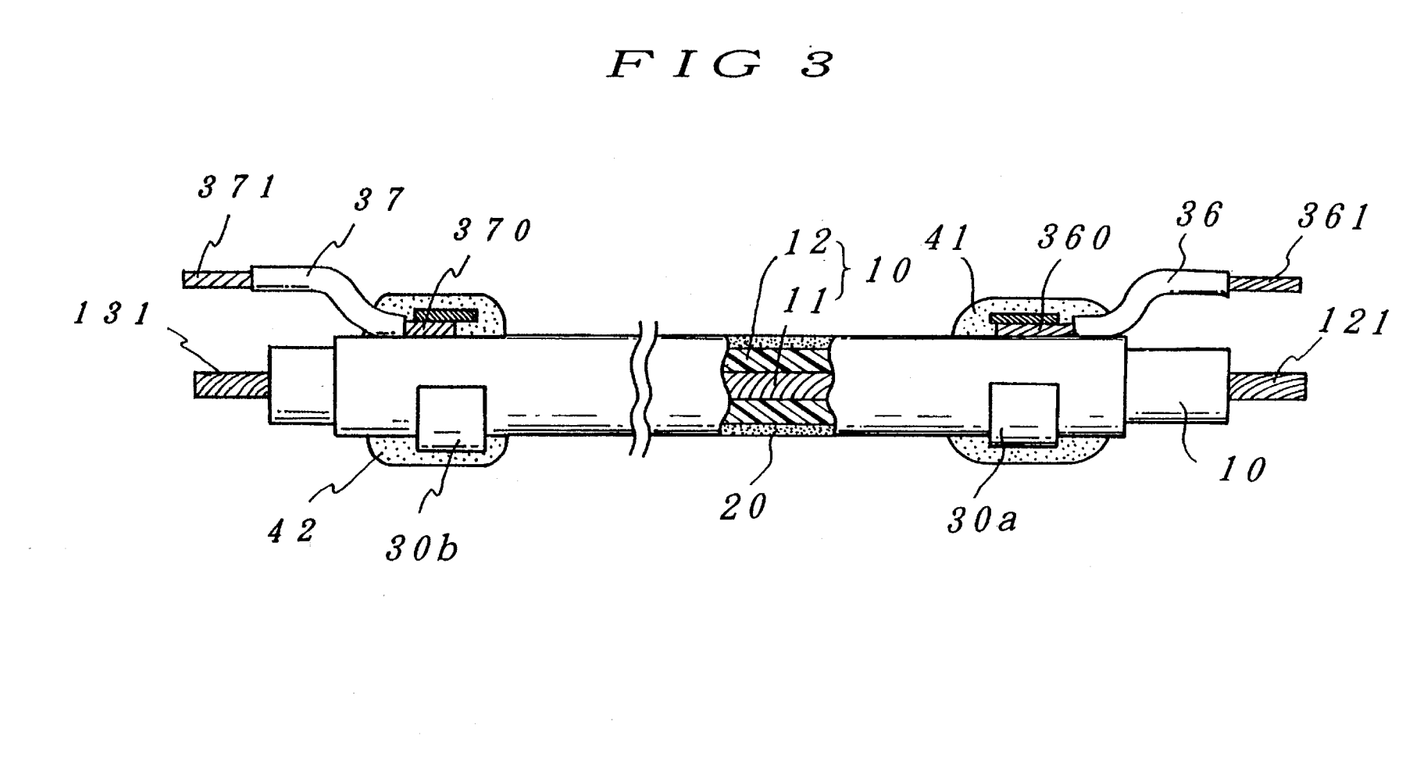
FIG. 3 is a view with a portion broken away for clarity, which shows an alternate embodiment of a wire-form sensor to be used in the present invention.

Specifically, the sensor is of a structure wherein a conductive layer 2 is formed on a core 1, and the conductor of a lead wire is press-adhered, with ring electrodes 3a and 3b, to the both ends of the above-mentioned conductive layer to form lead terminals 31 and 32, as shown in the perspective side view of FIG. 2, or of a structure wherein a conductor core 10 comprising a wire-form conductor 11 coated with an insulating layer 12 is used as a core; a conductive layer 20 is formed on said conductive core; conductors 360 and 370 from lead wires 36 and 37 at both ends of said conductive layer 20 are respectively press-adhered to the surface of the conductive layer 20 with the ring electrodes 30a and 30b to connect same; conductor end portions 361 and 371 from the above-mentioned lead wires are used as lead terminals; and conductor end portions 121 and 131 of the conductive core 10 are used as conductor terminals, as shown in the partially cutaway view of FIG. 3.

These sensors are capable of detecting the presence of a leaked liquid from a change in electric resistance caused when a low molecular weight organic liquid adheres to the conductive layers 2 and 20.

Preferable examples of the conductive layers 2 and 20 include those comprising swellable polymer and conductive carbon.

While the swellable polymer to be used for the above-mentioned conductive layer is subject to no particular limitation, styrene-ethylene-butadiene-styrene copolymers (SEBS), styrene-butadiene-styrene copolymers (SBS), and thermoplastic elastomers such as polybutadiene elastomer and olefin elastomer are preferably used from the aspect of swelling by liquid absorption. While the conductive carbon is subject to no particular limitation, conductive carbon black having DBP (dibutyl phthalate) oil content of not less than 250 ml/100 g and surface area of not less than 500 m$^2$/g (e.g. KETZEN BLACK, manufactured by Lion Co., Ltd., Japan), furnace black (e.g. VULCAN XC-72, manufactured by Cabot Inc., U.S.A.) and acetylene black (e.g. DENKA Acetylene Black, manufactured by Denki Kagaku Kogyo, Japan) are preferably used. Addition of a small amount of such carbon black increases conductivity, obviating necessary addition of carbon in large amounts to achieve sufficient conductivity, which in turn results in fine proccessability of the above-mentioned conductive layer.

The proportion of the carbon is 10–100% by weight, preferably 12–90% by weight, and particularly preferably 15–80% by weight relative to 100% by weight of the swellable polymer. When the carbon is used in a proportion of not less than 10% by weight relative to 100% by weight of the swellable polymer, conductivity of the conductive layer becomes sufficient. When the carbon is used in a proportion of not more than 100% by weight relative to 100% by weight of the swellable polymer, the swellable polymer can show sufficient swelling by liquid absorption when the conductive layer contacts a low molecular weight organic liquid, thus enabling definite detection of a change in electric resistance of the conductive layer, which in turn results in fine sensor performance.

The above-mentioned swellable polymer desirably has a Shore A hardness (hardness of rubber) by JIS Z2246 of not more than 70, preferably not more than 65, particularly preferably about 50, from the aspect of swelling by liquid absorption and proccessability. The conductive layer having a Shore A hardness of not more than 70 is advantageous, since the layer exhibits sufficient swelling by liquid absorption upon contact with a low molecular weight organic liquid, which in turn results in fine sensor function and fine proccessability.

The above-mentioned swellable polymer is preferably substantially non-crosslinked, from the aspect of swelling by liquid absorption.

Being substantially non-crosslinked means that the swellable polymer is not completely crosslinked and such substantially non-crosslinked swellable polymer also includes the above-mentioned thermoplastic elastomers partially crosslinked to the degree that thermoplasticity is maintained. That is, the substantially non-crosslinked swellable polymer in the present invention includes not only perfectly non-crosslinked swellable polymer which underwent no crosslinking process after the formation of a conductive layer, but also swellable polymers partially crosslinked before the processing. The degree of crosslinking, when the swellable polymer is partially crosslinked, is defined by JISC3005 and is preferably expressed by gel proportion of 3–50%, preferably 4–40% and more preferably 5–30% as determined by extraction with xylene at 50° C. When the degree of crosslinking of the above-mentioned swellable polymer is not more than 50%, the polymer can show sufficient swelling by liquid absorption upon-contact with a low molecular weight organic liquid, thus improving sensor performance and proccessability.

It is preferable to add a suitable amount of an oil-absorbing swelling agent to the conductive layer material in order to improve swelling property. Addition of an oil-absorbing swelling agent results in greater degree of swelling of the conductive layer upon contact with the liquid to be detected, and variation in the electric resistance becomes greater even when only a trace amount of a low molecular weight organic liquid exists, thus permitting higher sensitivity of the sensor. Examples of the oil-absorbing swelling agent include oil-absorbing natural plant agent such as pulp, beet and cotton, oil-absorbing inorganic agent obtained by water repellent finishing of inorganic porous powder (e.g. silica and pearlite), oil-absorbing synthetic fiber agent such as polypropylene, polystyrene and polyethylene, oil-absorbing foamed polymer agent such as foamed polyurethane, and swellable oil-absorbing polymer (see Japanese Patent Unexamined Publication No. 221582/1991) comprising crosslinked polymer of specific (meth)acrylate monomers.

It is preferable that the above-mentioned oil-absorbing swelling agent be contained in a proportion of 2–60% by weight, preferably 10–50% by weight and more preferably 20–40% by weight per 100% by weight of the material to be used for the conductive layer. When the oil-absorbing swelling agent is contained in a proportion of 2% by weight or more, the degree of swelling of the conductive layer upon contact with the liquid to be detected becomes sufficient, while when it is in a proportion of not more than 60% by weight, degradation of proccessability of the conductive layer material into a desired shape occurs less frequently.

The above-mentioned core mainly plays the role of a mechanical reinforcement of the conductive layer. That is, the conductive layer which has preferably been made thinner to seek higher sensitivity requires a core so as to mechanically reinforce the thin layer.

The core is not subject to any limitation as long as its surface is an insulating material, and is exemplified by those entirely made of an insulating material and those obtained by coating an insulating material on a conductor. For example, an insulating rubber or plastic rod, or a metal rod conductor provided with an insulating coating such as rubber and plastic, can be preferably used for facilitating detection of the resistance variation of the conductive layer.

A fluororesin, such as ethylene-tetrafluoroethylene (ETFE) and polytetrafluoroethylene (PTFE), which does not substantially swell upon contact with a low molecular weight organic liquid as the above-mentioned insulating material is preferable, since adverse influence on the swell-deformation of the conductive layer becomes less.

The shape of the above-mentioned core can be, besides the round rod shape as shown in FIG. 2, plate shape or square rod shape.

The size of the core is appropriately determined according to the kind and shape of the material, so that the core can have a mechanical strength necessary as a reinforcement member and the resistance of the conductive layer can be suitable. For example, a plastic (e.g. ETFE) round rod core suitably has a diameter of about 1–7 mm.

As a means for forming the conductive layer on the core, there are methods including axially wrapping or longitudinally wrapping a conductive tape prepared by rolling or pressing, around the core. A method of extrusion coating of a molten conductive layer material on a core is the simplest and most desirable method.

The conductive layer material in the present invention has an advantage of good proccessability during extrusion coating.

While the thickness of the above-mentioned conductive layer varies depending on length, material, carbon content, and shape and size of the core, it is generally preferably about not more than 1 mm, more preferably about not more than 0.5 mm, when coating on a round rod core of about 1–7 mm in diameter is desired. A conductive layer having a thickness of not more than about 0.5 mm results in fine sensitivity of the sensor. In view of the proccessability, the conductive layer generally preferably has a thickness of about not less than 0.1 mm.

For forming a lead terminal of the above-mentioned sensor, a lead wire conductor is adhered to the electrode of the sensor by press-adhesion (e.g. crimping), welding or the like. Also, watertight insulation coatings 41 and 42 provided on said connections by using epoxy resin, water-proof shrinkage tubes, or the like, as shown in FIG. 3, are preferable, since galvanic corrosion at the electrodes can be retarded, and the sensor function is not impaired even when the sensor is exposed to rain and the like.

According to the sensor structure as mentioned above, the conductive layer swells upon contact with a low molecular weight organic liquid to cause immediate variation of electric resistance. The variation of the electric resistance is detected by an electric resistance detector, whereby the presence of a low molecular weight organic liquid is detected with high precision.

In the present invention, plural sensors of the above-mentioned configuration are used, which are electrically connected in series by connecting the conductive layer thereof with a lead wire and the like. The sensor located at the terminal end of the plural sensors thus connected is provided with a return wire. To be specific, one end of the return wire is electrically connected to the conductive layer of the said end sensor and the other end of the wire is electrically connected to the detector.

Figure 4:
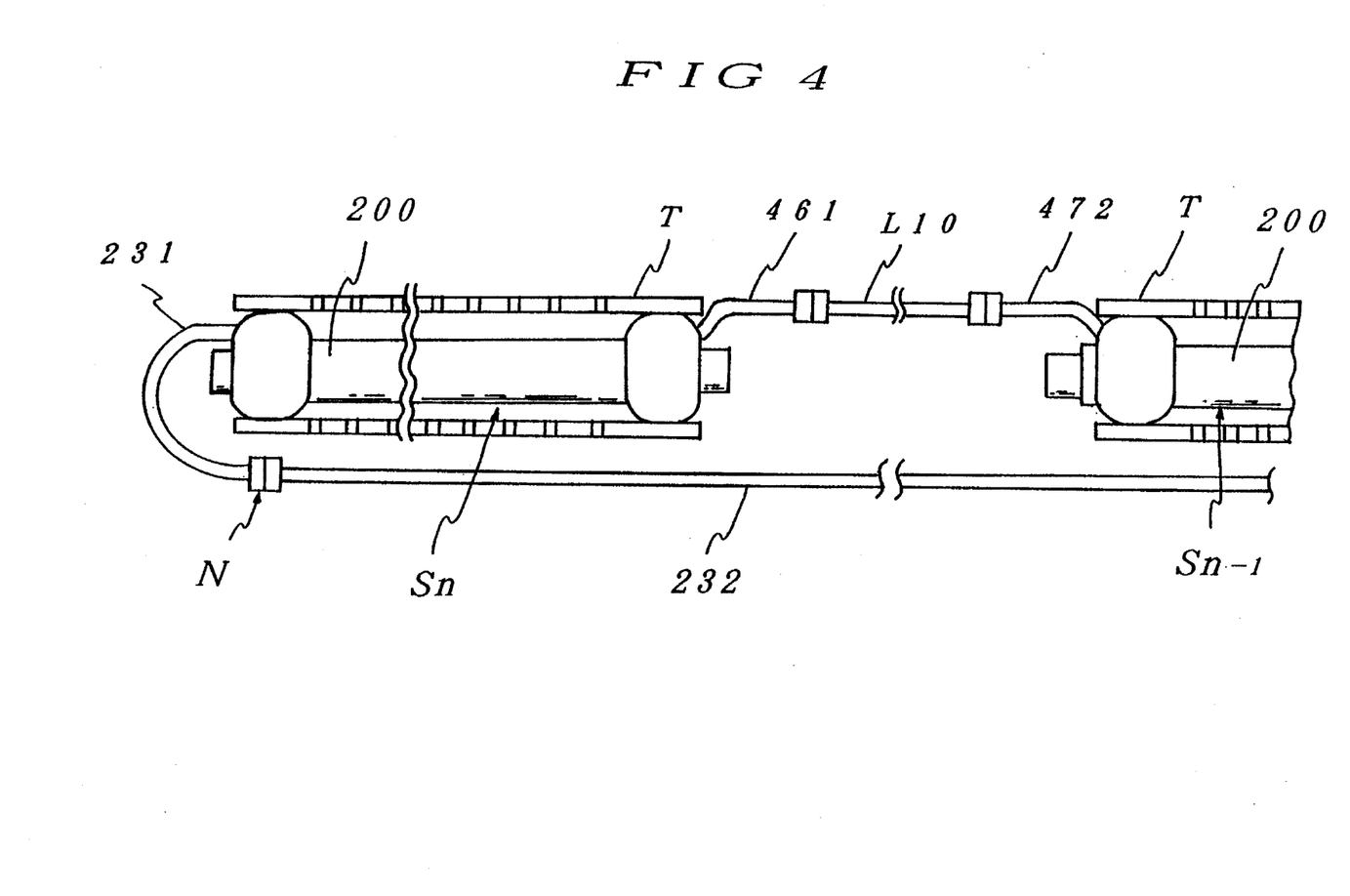
FIG. 4 is a side view showing one embodiment of a connection of a wire-form sensor.

For example, when a sensor having a core entirely composed of an insulating material, as shown in FIG. 2, is used, the connection between the terminal end sensor and the next sensor is as shown in FIG. 4. That is, a lead terminal 461 at one end of the sensor Sn located at the terminal end and a lead terminal 472 of the sensor Sn-1 next to said sensor Sn are connected via a lead wire L10, and a lead terminal 231 at the other end of the sensor Sn located at the terminal end and a return wire 232 are electrically connected, whereby the conductive layers 200 of the sensors and the return wire 232 are electrically connected.

Figure 5:
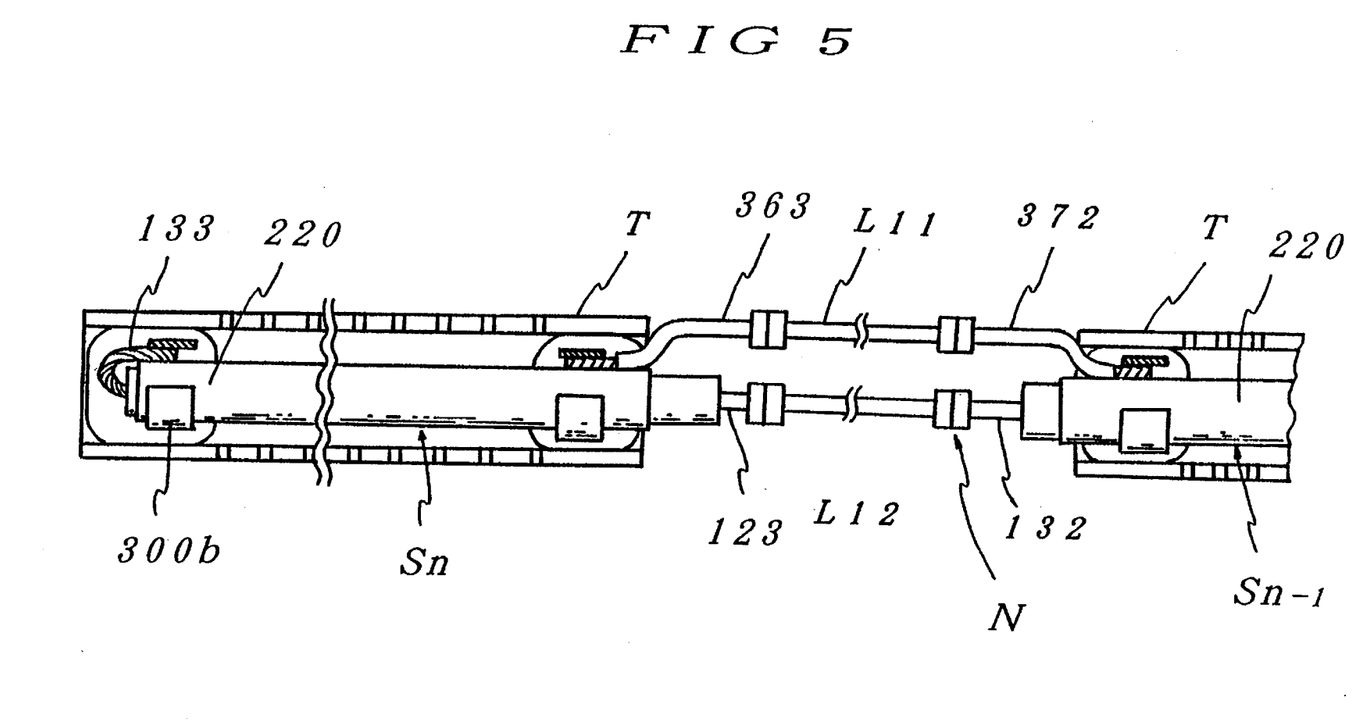
FIG. 5 is a side view showing an alternate embodiment of a connection of a wire-form sensor.

When a sensor having, as a core, a conductive core prepared by forming an insulating layer on a wire conductor, as shown in FIG. 3, is used, the connection between the terminal end sensor and the sensor adjacent thereto is as shown in FIG. 5. That is, a lead terminal 363 at one end of the sensor Sn located at the terminal end and a lead terminal 372 of the sensor Sn-1 adjacent to said sensor Sn are connected via a lead wire L11, and a wire conductor 133 at the terminal end of the sensor Sn located at the terminal end is connected to the surface of the conductive layer 220 by press-adhesion with a ring electrode 300b, a wire conductor 123 at the other end of the sensor Sn located at the terminal end and a wire conductor 132 of the sensor Sn-1 next to this sensor Sn are electrically connected via a lead wire L12, whereby the conductive layers 220 and the wire conductors 133, 123 and 132 are electrically connected. In this embodiment, the wire conductor of the conductive core to be used as a core of the sensor functions as the return wire.

As shown in FIGS. 4 and 5, connectors N, preferably waterproof connectors, are desirably applied to the connector terminals so that the connectors N can be freely attached to one another in a detachable manner. Such waterproof connector is formed, for example, by applying a waterproof compound to a connection (engagement section) or by combinedly using a rubber seal (e.g. silicone rubber seal).

The above-mentioned sensor detachably connected as described is advantageous in that replacement of a shorter sensor, which has functioned upon detection of a leaked liquid, for a new sensor is facilitated.

As shown in FIGS. 4 and 5, housing the sensor in an electrically insulating porous body T is desirable to prevent changes in the initial electric resistance (resistance before contact with low molecular weight organic liquid), which may be caused by an external force applied during installation of the sensor or by contact with metal pipe constituting the pipeline.

This porous body T is formed into, for example, a cylinder by molding, laminating or braiding, using a material such as polyvinyl chloride, nylon, polypropylene, polyester and fluororesin to cover the aforementioned wire sensor.

In the present invention, it is preferable that the above-mentioned electrically insulating porous body T be formed, on the sensor's outermost layer, into a cylindrically braided body made of fiber yarns of the above material, such as polyester or fluororesin fibers, of about 100–1,000 denier. Of the above-mentioned materials, polyester, particularly polybutylene terephthalate is preferable from the aspect of flame resistance.

The above cylindrically braided body may be either a tight fitting or a loose fitting. In consideration of swelling and deformation of the conductive layer, however, a loose fitting is preferable.

Sensors of the length sufficient to detect leakage of low molecular weight organic liquid from the possible leakage site are used in the present invention. The length of the sensor is appropriately determined depending on the shape and size of the site where the sensor is to be installed, and resistance of the sensor. These sensors are readily manufactured by, for example, cutting a long sensor. While the resistance of the sensor varies depending on the resistance of the long sensor to be cut, shorter sensor shows smaller resistance.

In the present invention, such shorter sensors are installed at the possible sites of low molecular weight organic liquid leakage. The embodiment of the present invention as shown in FIG. 1 comprises sensors provided on the metal tube connection or valve attachment of a pipeline.

The total initial resistance between both end portions of the sensors is preferably within 500 k$\Omega$. A sensor having a resistance within 500 k$\Omega$ seldom suffers from external noises. According to the present invention, it is possible to determine the length of the shorter sensor and install a number of such sensors to the extent that the total maximum resistance of the sensors does not exceed 500 k$\Omega$, over the length of, for example, not less than a dozen-odd meters.

To be specific, a long sensor having about 40 k$\Omega$/m resistance is cut into 0.25 m long sensors, which can be connected into a maximum series of 50 sensors to have the maximum resistance of not more than 500 k$\Omega$, thus enabling simultaneous detection of low molecular weight organic liquid leakage at 50 sites.

The initial resistance of each sensor can be adjusted by changing the distance between electrodes, carbon content and thickness of the conductive layer, and the like.

The sensors installed at every possible site of low molecular weight organic liquid leakage are electrically connected in series by lead wires and the like, and said sensors are electrically connected to an electric resistance detector by a lead wire and the like. The electric resistance detector may be any as long as it is equipped with an electric resistance detection circuit and capable of detecting a change in the electric resistance of the sensor, which is exemplified by those equipped with a circuit having an applied electronic comparator. The electric resistance detector is preferably connected to an alarm means which emits alarm signals, such as light, sound and radio signals, when resistance variation is detected. Examples of the alarm means include light emitting device using an LED, alarm sound device and radio signal emitting device using a feeble electric wave.

The above-mentioned construction enables simultaneous detection of the leakage of low molecular weight organic liquid at possible leakage sites which are located over a wide area, by way of the sensors installed at such sites.

Figure 6:
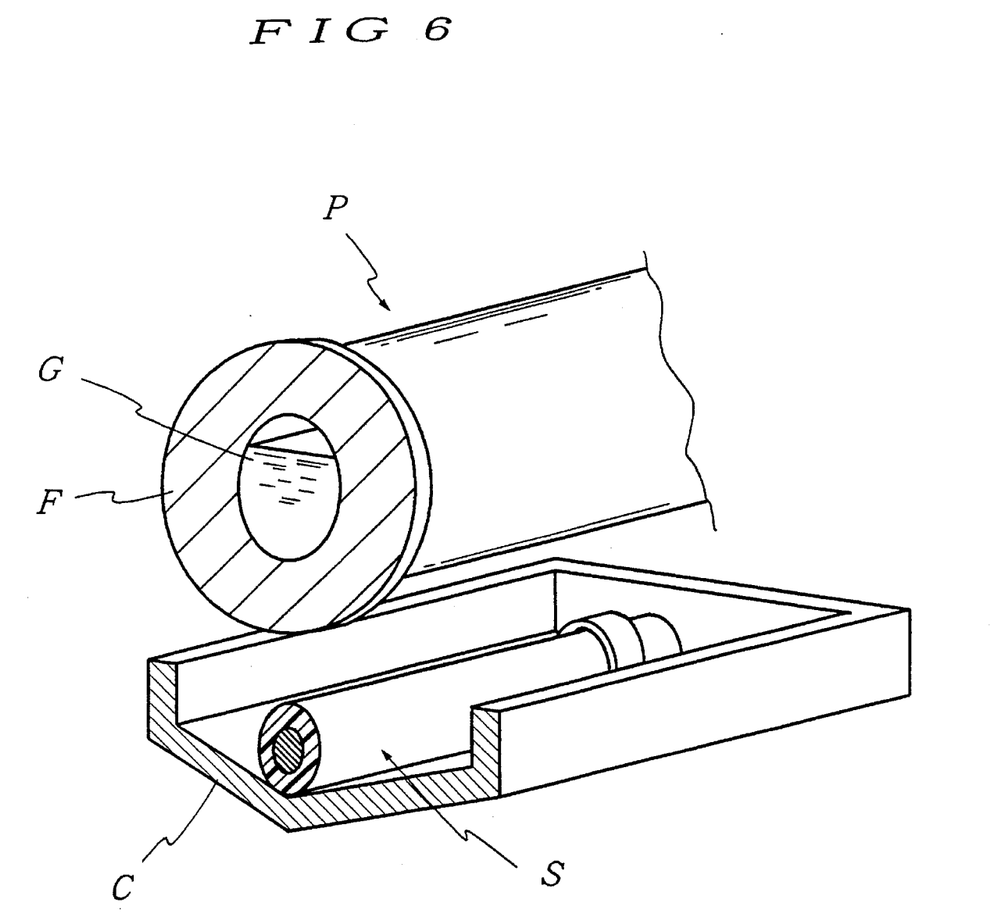
FIG. 6 is a partial perspective sectional view showing one embodiment of the liquid leakage detection system with a leaked liquid gathering means.

Alternatively, a leaked liquid gathering means capable of gathering the leaked liquid is mounted near the possible leakage sites, and a sensor is set at the position permitting detection of the low molecular weight organic liquid gathered by said gathering means. For example, a gutter-shaped leaked liquid gathering means C is set under a flange section F of the pipeline P, as shown in FIG. 6, and a sensor S is installed along the longitudinal direction at the center of the leaked liquid gathering means C, where the gathered liquid resides. While the shape of the leaked liquid gathering means C is not subject to any particular limitation as long as it can gather the leaked liquid, gutter-shaped ones as shown in FIG. 6 and flat dish-shaped ones are preferable, since they permit easy gathering of the leaked liquid. When installing a sensor at a flange part of pipeline as mentioned above, a leaked liquid gathering means of a cylindrical shape, a box shape or the like, which is installed to surround the flange part for the possibility that the liquid G under transportation may gush out from the upper portion of the flanges, ensures dependable recovery of the leaked liquid, even when the leaked liquid runs every direction. The preferable example of the material of the leaked liquid gathering means C is a galvanized steel plate, from the aspects of weatherability and proccessability. The size of the leaked liquid gathering means C is appropriately determined according to the size of the possible leakage site.

The above-mentioned construction enables ensured detection of a low molecular weight organic liquid which has leaked from a possible leakage site.

In the embodiment of FIG. 1, sensors are installed at three sites from which a low molecular weight organic liquid may leak, thereby enabling simultaneous detection of the liquid leakage from the three sites.

While the above example shows an embodiment comprising a sensor installed under a flange portion, it is also preferable that the sensor be installed around the joint of the flange, in consideration of the possible gushing out of the liquid under transportation from the upper portion of the flange.

In the above embodiment, a liquid leakage detection system, wherein sensors are installed and connected by a lead wire, and said sensors are connected to an electric resistance detector by a lead wire, is constructed using one detection unit. Alternatively, two or more detection units may be used for forming a liquid leakage detection system.

While the above-mentioned embodiment shows a system for detecting a low molecular weight organic liquid leakage, which is to be installed on a pipeline, the system is also applicable to large volume containers storing low molecular weight organic liquids.

The liquid leakage detection system of the present invention can be applied to the sites on a flat surface by, for example, allowing the sensors to snake thereon, besides the wire-form installation as shown in FIG. 1.

As described above, the low molecular weight organic liquid leakage detection system of the present invention comprises plural sensors installed at plural sites on a pipeline where leakage may occur, thereby obviating continuous provision of the sensors adjacent to the pipeline or winding the sensors therearound throughout the entire length, which in turn allows production of the leakage detection system at lower costs. In addition, the detection system of the present invention is of the structure wherein sensors are installed at every possible leakage site and the sensors are electrically connected in series by a lead wire etc. to enable detection of resistance variation developed in the sensor, whereby leakage of low molecular weight organic liquid can be precisely and efficiently detected over a wide area, particularly to the longitudinal direction. Moreover, the maximum resistance can be made not to exceed 500 kΩ even when the sensors are installed for the entire length of, for example, not less than a dozen-odd meters. Hence, leakage of low molecular weight organic liquid can be precisely detected without influence of external noise.

What is claimed is:

1. A low molecular weight organic liquid leakage detection system for detecting leaks in a container or pipe, comprising plural sensors, each sensor having the structure of an electrically conducting layer disposed on an electrically insulating surface of a reinforcing core providing mechanical strength to the sensor, where the plural sensors are
   (a) installed at possible leakage sites of said container or pipe,
   (b) electrically connected in series, and
   (c) electrically connected to an electric resistance detector, and each of said sensors
   (d) has wire leads and terminals connected to a conductive layer, placed at a plurality of locations on said container or pipe,
   (e) is capable of showing an electrical resistance variation upon contact of said conductive layer with a low molecular weight organic liquid leaked out from said container or pipe, and
   (f) is detachably connected by mating connector halves as installed on each of the plurality of sensors at the end of wire leads or terminals, such detachable connection of mating connector halves being accomplished in a waterproof or nonwaterproof manner.

2. The detection system according to claim 1, wherein each of the sensors comprises, on an insulating core, a conductive layer capable of showing an electric resistance variation upon contact with a low molecular weight organic liquid.

3. The detection system according to claim 1, wherein each of the plurality of sensors is built in an electrically insulating porous body.

4. The detection system according to claim 1, wherein the total initial resistance of the electrically connected sensors is not more than 500 kΩ.

5. The detection system according to claim 1, further comprising a leaked liquid gathering means provided near the possible leakage site, wherein the sensor is installed at a position permitting detection of a low molecular weight organic liquid gathered by said leaked liquid gathering means.

6. The detection system according to claim 2, wherein the conductive layer comprises a polymer material which swells by liquid absorption, and a conductive carbon.

7. The detection system according claim 2, wherein the core is composed of a conductor coated with an insulating layer, and said conductor is electrically connected to the conductor of the core of a next sensor.

8. The detection system according to claim 6, wherein the polymer has a Shore A hardness of not more than 70.

9. The detection system according to claim 6, wherein the polymer is substantially non-crosslinked.

10. A low molecular weight organic liquid leakage detection system for detecting leaks in a container or pipe, comprising plural sensors, each sensor having the structure of an electrically conducting layer disposed on an electrically insulating surface of a reinforcing core providing mechanical strength to the sensor, where the plural sensors are
   (a) adapted to be installed at possible leakage sites of the container or pipe, and
   (b) electrically connectable to an electric resistance detector, and each of said sensors
   (c) has wire leads and terminals connected to a conductive layer, to be placed at a plurality of locations on the container or pipe,
   (d) is capable of showing an electrical resistance variation upon contact of said conductive layer with a low molecular weight organic liquid leaked out from the container or pipe, and
   (e) is detachably and electrically connectable in series by mating connector halves as installed on each of the plurality of sensors at the end of wire leads or terminals, such detachable connection of mating connector halves to be accomplished in a waterproof or nonwaterproof manner.

* * * * *